US008890876B1

(12) United States Patent  
Glaskowsky

(10) Patent No.: US 8,890,876 B1
(45) Date of Patent: Nov. 18, 2014

(54) MICROPROCESSOR INCLUDING A DISPLAY INTERFACE IN THE MICROPROCESSOR

(75) Inventor: Peter N. Glaskowsky, Santa Clara, CA (US)

(73) Assignee: Oracle America, Inc., Redwood Shores, CA (US)

(*) Notice: Subject to any disclaimer, the term of this patent is extended or adjusted under 35 U.S.C. 154(b) by 1146 days.

(21) Appl. No.: 11/963,603

(22) Filed: Dec. 21, 2007

(51) Int. Cl.
*G06F 13/14* (2006.01)

(52) U.S. Cl.
USPC ........... 345/519; 345/501; 345/520; 345/503; 345/531; 710/313; 710/315; 710/312; 710/100; 710/306

(58) Field of Classification Search
USPC ........... 345/156, 519, 501, 520, 503, 531; 710/5, 163, 313, 315, 312, 100, 306; 711/1, 103, 108, 115
See application file for complete search history.

(56) References Cited

U.S. PATENT DOCUMENTS

| | | | |
|---|---|---|---|
| 5,649,173 A | 7/1997 | Lentz | |
| 5,790,134 A | 8/1998 | Lentz | |
| 5,918,057 A * | 6/1999 | Chou et al. | 710/260 |
| 6,184,906 B1 | 2/2001 | Wang et al. | |
| RE37,944 E | 12/2002 | Fielder et al. | |
| 6,518,970 B1 | 2/2003 | Glen et al. | |
| 6,608,625 B1 | 8/2003 | Chin et al. | |
| 6,801,207 B1 | 10/2004 | Tischler et al. | |
| 6,822,654 B1 * | 11/2004 | Iwamoto et al. | 345/520 |
| 6,850,240 B1 * | 2/2005 | Jones, Jr. | 345/503 |
| 6,975,324 B1 | 12/2005 | Valmiki et al. | |
| 7,051,139 B2 | 5/2006 | Peleg et al. | |
| 7,139,849 B2 | 11/2006 | Tojima et al. | |
| 7,391,409 B2 * | 6/2008 | Zalewski et al. | 345/156 |
| 7,472,301 B2 * | 12/2008 | Ginggen et al. | 713/324 |
| 7,617,403 B2 * | 11/2009 | Capps et al. | 713/300 |
| 2003/0001856 A1 * | 1/2003 | Sawada et al. | 345/581 |
| 2005/0049729 A1 * | 3/2005 | Culbert et al. | 700/50 |
| 2005/0156933 A1 * | 7/2005 | Lee et al. | 345/520 |
| 2005/0160251 A1 * | 7/2005 | Zur et al. | 712/1 |
| 2005/0268141 A1 * | 12/2005 | Alben et al. | 713/500 |
| 2005/0285863 A1 * | 12/2005 | Diamond | 345/519 |
| 2006/0066907 A1 * | 3/2006 | Nakata et al. | 358/3.1 |
| 2006/0206627 A1 * | 9/2006 | Kardach et al. | 710/5 |
| 2006/0267987 A1 * | 11/2006 | Litchmanov | 345/502 |
| 2006/0271797 A1 * | 11/2006 | Ginggen et al. | 713/300 |
| 2007/0219644 A1 * | 9/2007 | Sonobe | 700/12 |
| 2007/0283175 A1 * | 12/2007 | Marinkovic et al. | 713/320 |
| 2008/0028236 A1 * | 1/2008 | Capps et al. | 713/300 |
| 2008/0143731 A1 * | 6/2008 | Cheng et al. | 345/502 |
| 2008/0168286 A1 * | 7/2008 | Tupman | 713/320 |
| 2008/0204460 A1 * | 8/2008 | Marinkovic et al. | 345/502 |
| 2009/0109230 A1 * | 4/2009 | Miller et al. | 345/506 |
| 2010/0302567 A1 * | 12/2010 | Ozaki | 358/1.9 |
| 2011/0169840 A1 * | 7/2011 | Bakalash | 345/505 |
| 2011/0212761 A1 * | 9/2011 | Paulsen et al. | 463/25 |
| 2012/0042190 A1 * | 2/2012 | Azar et al. | 713/324 |

\* cited by examiner

Primary Examiner — Abderrahim Merouan
(74) Attorney, Agent, or Firm — Osha Liang LLP

(57) ABSTRACT

A processing system is disclosed. The processing system comprises a first integrated circuit. The first integrated circuit includes a processor core, a display interface and memory controller coupled to a first bus interface. The display interface is adapted to display graphical information generated by a graphics engine. A graphics engine is not on the first integrated circuit. The processing system includes a second bus interface for allowing communication with the first integrated circuit via the first bus interface. The second bus interface is adapted to allow for communication to a graphics engine.

24 Claims, 8 Drawing Sheets

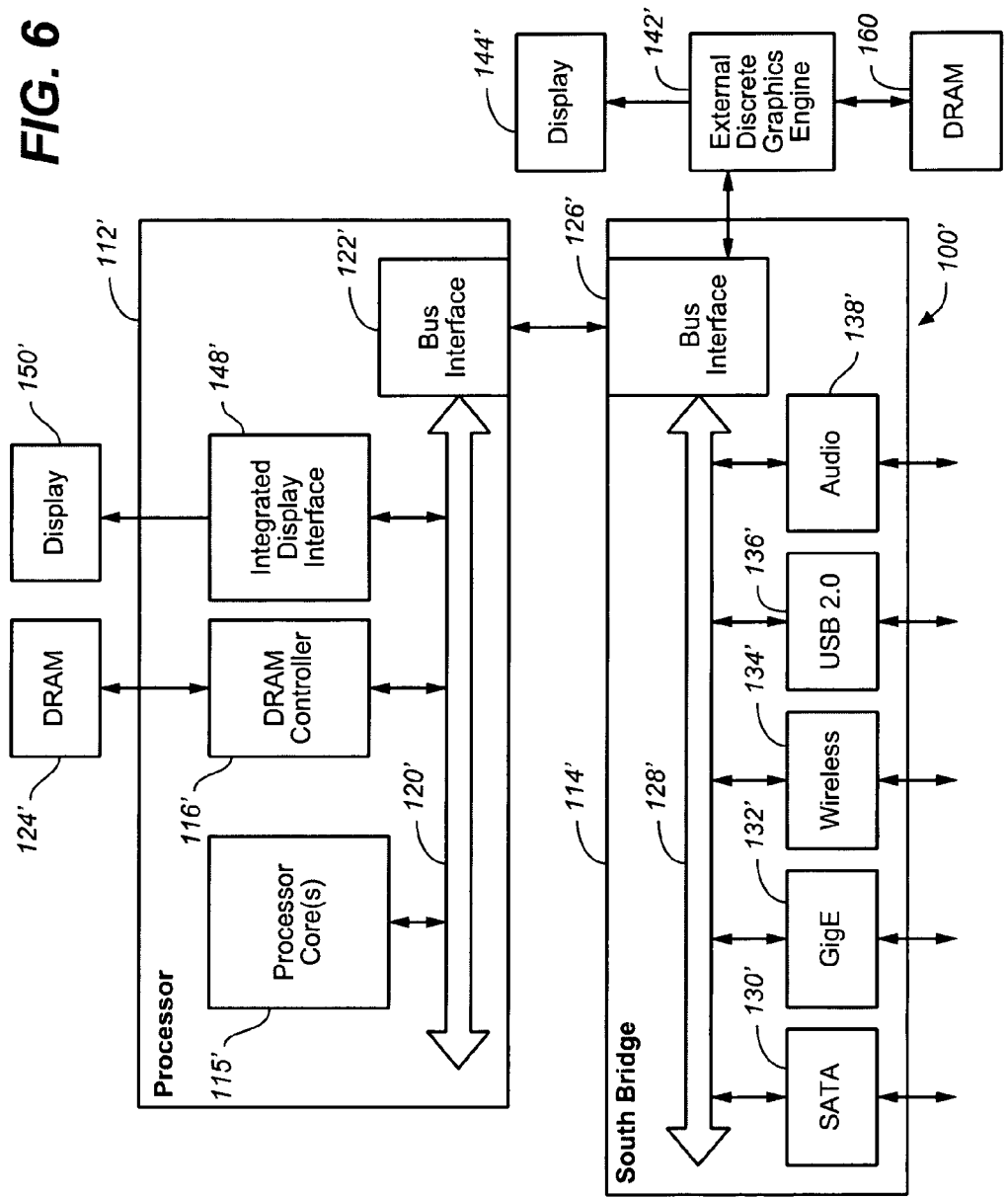

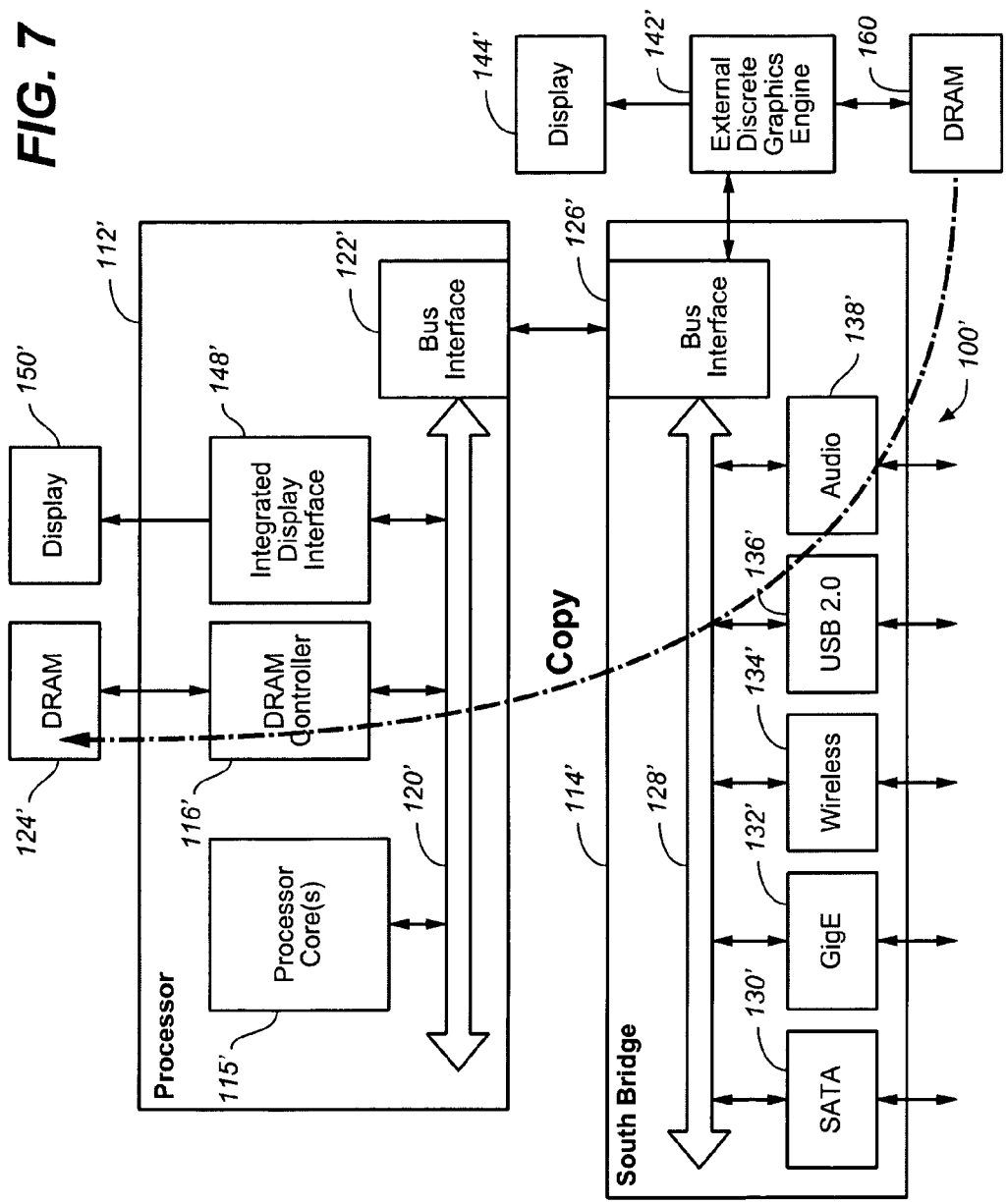

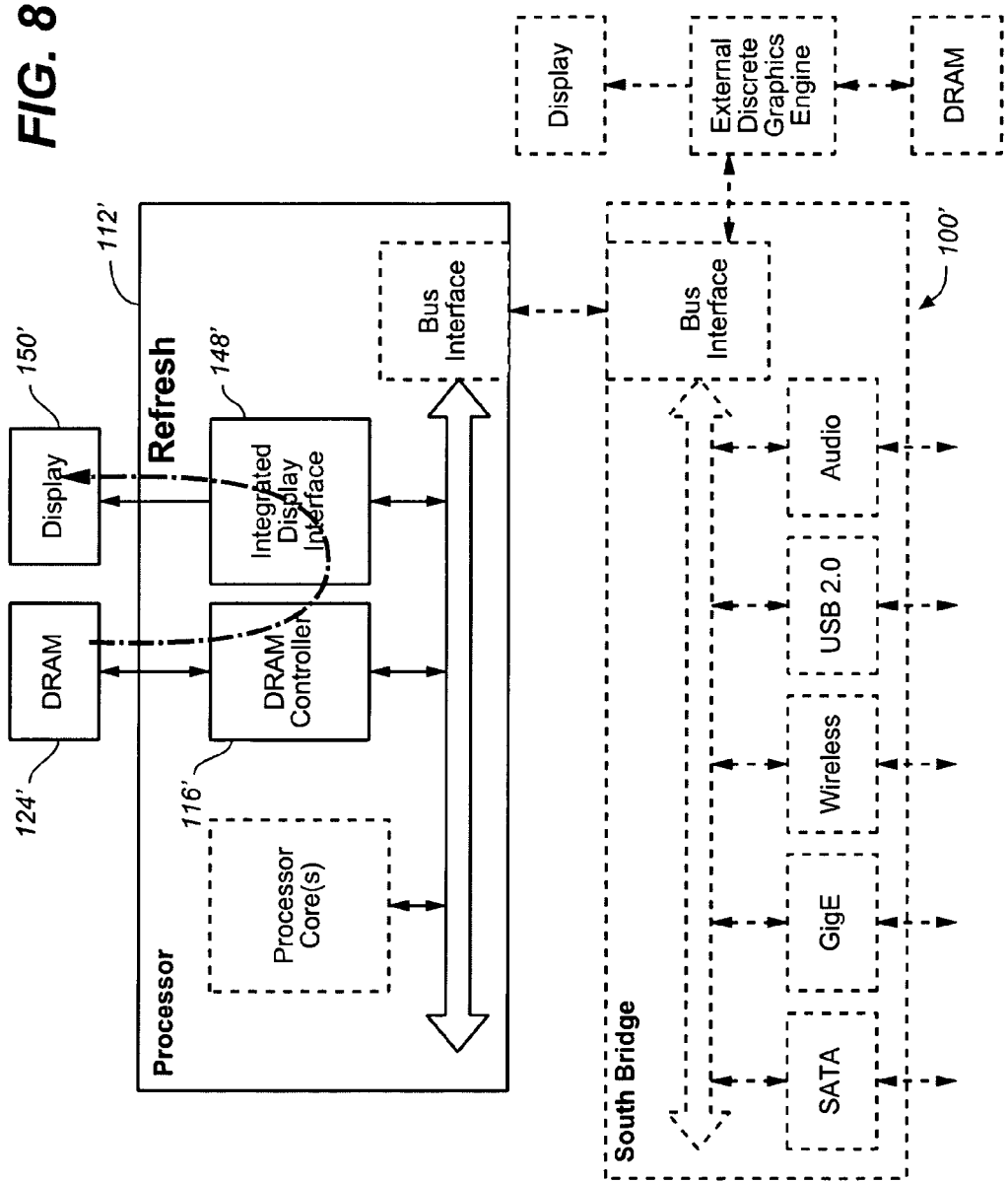

MICROPROCESSOR INCLUDING A DISPLAY INTERFACE IN THE MICROPROCESSOR

BACKGROUND OF THE INVENTION

Today, microprocessor systems with a local display device such as a liquid-crystal display may use a discrete graphics chip or an integrated graphics engine (commonly called a GPU) built into a core-logic chip such as a north bridge or south bridge.

FIG. 1 is a diagram of a first conventional microprocessor system 10. The microprocessor system 10 comprises a processor 12 coupled to a south bridge 14. The processor 12 includes one or more processor cores 15, a DRAM controller 16, both of which are coupled to a bus 20. The bus 20 is coupled to a first bus interface 22. The DRAM controller 16 can be coupled to a DRAM 24. The south bridge 14 communicates with the processor 12, via a second bus interface 26 to the first bus interface 22. The south bridge 14 includes a second bus 28, which is coupled to a plurality of input-output (I/O) devices 30-40.

The second bus interface 26 communicates with a graphics engine external 42 to the south bridge 14, which can be coupled to a display 44 and a second memory 46.

FIG. 2 is a second conventional microprocessor system 10', in which similar elements have similar numbers to FIG. 1. In FIG. 2, the integrated graphics engine 42' is internal to the south bridge 14' and is coupled to a display 44'.

The integrated solution of FIG. 3 usually shares the system's main memory 24' between the processor core 15' and the graphics engine 42', an approach known as Unified Memory Architecture (UMA). Sometimes, especially in upgraded systems, both discrete and integrated solutions are present at the same time. The graphics engine 42' has an associated display interface on the same chip, such as RGB or DVI so some systems have two interfaces when only one is needed.

In UMA systems that have the main memory interface, integrated into the microprocessor, the integrated-graphics solution requires display refresh data to be transferred from the memory 24 to the processor core 15 via the memory bus, then from the processor 12 to the graphics engine 42 in the south bridge 14 via a front-side bus. This extra transfer wastes energy and reduces system performance by consuming some of the bandwidth of the front-side bus.

In some systems, the graphics engine 42 is integrated into the microprocessor chip. FIG. 3 is a third conventional microprocessor system 10" in which similar elements have similar numbers as in FIG. 1. In FIG. 3, the graphics engine 42" is part of the processor 12".

A fully integrated UMA solution such as that above is acceptable for low-end systems, but not for mid-range or high-end systems. Modern processor cores are already large and expensive to manufacture, and a good graphics engine is just as large and complex as a processor core. Combining both a processor core and a graphics engine on one chip imposes an unacceptably high cost penalty. Accordingly what is desired is a microcomputer that overcomes the above-mentioned issues. The present invention addresses such a need.

SUMMARY OF THE INVENTION

A processing system is disclosed. The processing system comprises a first integrated circuit. The first integrated circuit includes a processor core, a display interface and memory controller coupled to a first bus interface. The display interface is adapted to display graphical information generated by a graphics engine. The graphics engine is not on the first integrated circuit. The processing system includes a second bus interface for allowing communication with the first integrated circuit via the first bus interface. The second bus interface is adapted to allow for communication to the graphics engine.

BRIEF DESCRIPTION OF THE DRAWINGS

FIG. 6 has similar elements to that of FIG. 4, except that the graphics engine is external to the south bridge, according to another embodiment of the present invention.

FIG. 7 illustrates the system of FIG. 6 in which the contents of the currently active frame buffer copied from the dedicated graphics memory to main memory.

FIG. 8 illustrates the system of FIG. 6 in which the graphics engine either put into a low-power configuration or powered off.

DETAILED DESCRIPTION

The present invention relates generally to microprocessors and more particularly to an integrated display interface. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

As known by one of ordinary skill in the art, this invention, including any logic circuit or transistor circuit, may be modeled, generated, or both by computer based on a description of the hardware expressed in the syntax and the semantics of a hardware description language (HDL). Such HDL descriptions are often stored on a computer readable medium. Applicable HDLs include those at the layout, circuit netlist, register transfer, and/or schematic capture levels. Examples of HDLs include, but are not limited to: GDS II and OASIS (layout level); various SPICE languages, and IBIS (circuit netlist level); Verilog and VHDL (register transfer level); and Virtuoso custom design language and Design Architecture-IC custom design language (schematic capture level). HDL descriptions may also be used for a variety of purposes, including but not limited to layout, behavior, logic and circuit design verification, modeling, and/or simulation.

It is desirable to be able to offer both high-end and low-end microprocessors using a common package pinout. Such commonality would improve the chances of commercial success for both products, since they could use a common motherboard design. A microprocessor system in accordance with the present invention addresses the above identified features of the present invention in more detail, refer to the following.

A system and method in accordance with the present invention, a microprocessor includes memory interface and a display interface as well as the logic necessary to connect these two interfaces. The microprocessor package pinout could be made the same as a fully integrated product that includes a microprocessor, a memory interface, a graphics engine, and a display interface.

Figure 4:
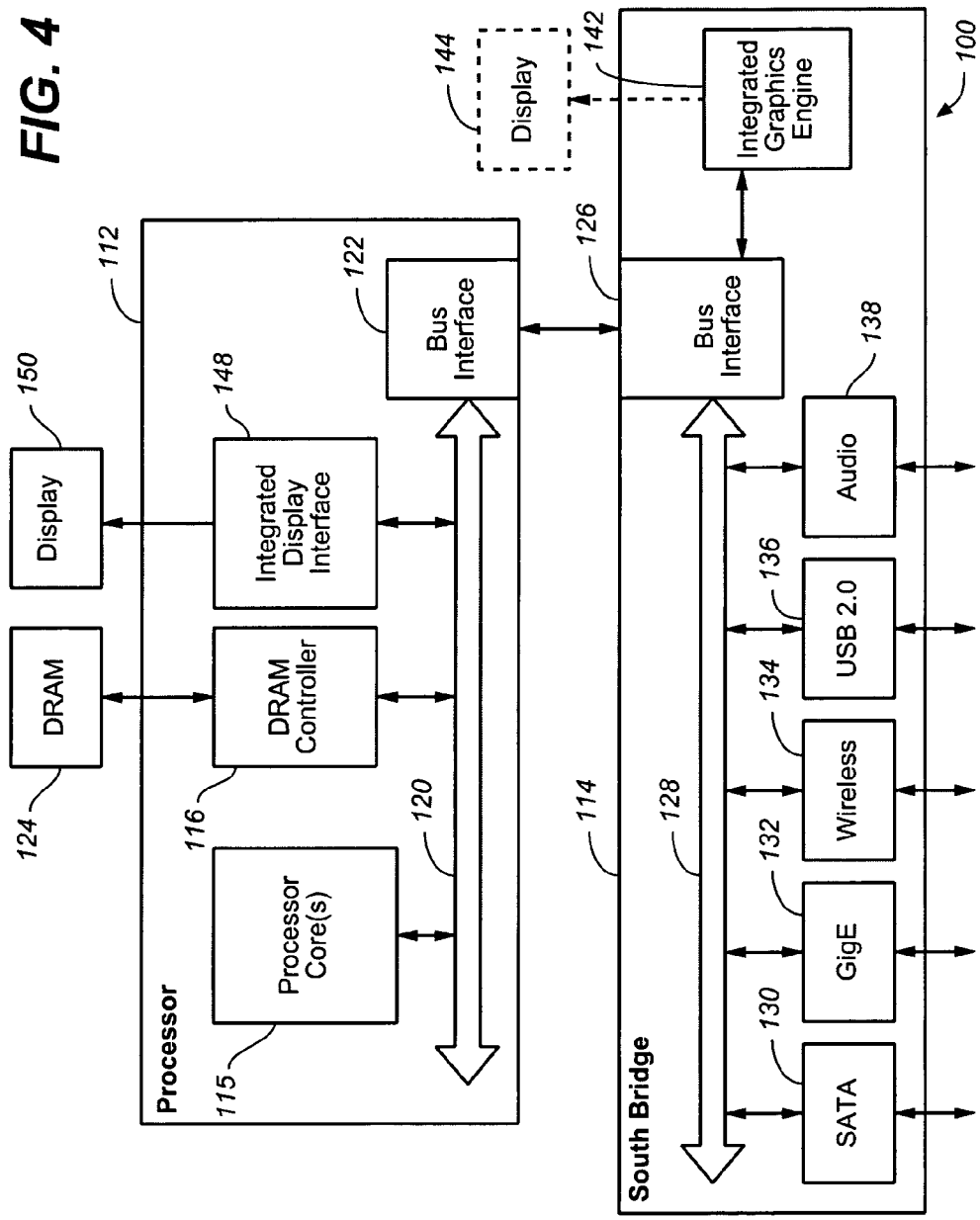
FIG. 4 is a diagram of an embodiment of a microprocessor system in accordance with the present invention.

FIG. 4 is a diagram of a first embodiment of a microprocessor system 100 in accordance with an embodiment of the present invention. The microprocessor system 100 comprises a processor 112 coupled to a south bridge 114. The processor 112 includes one or more processor cores 115, a DRAM controller 116, both of which are coupled to a bus 120. The system 100 includes an integrated display interface 148 which is coupled to a display 150 and to bus 120. The bus 120 is coupled to a first bus interface 122. The DRAM controller 116 coupled to a DRAM 124. The south bridge 114 communicates with the processor 112, via a second bus interface 126 to the first bus interface 122. The south bridge 114 includes a second bus 128, which is coupled to a plurality of input-output devices 130-138.

In this embodiment, the bus interface 126 communicates with an internal graphics engine 142, which can be coupled to a display 144.

The microprocessor system 100 could operate with a graphics engine 142 that has an interface to a display 144 or the system 100 could operate with a graphics engine 142 that does not have an interface to a display.

As before mentioned, the microprocessor system 100 includes one or more processor cores 115, the display interface 148 which includes the necessary logic to support display-refresh operations and to display graphical information by a graphics engine, and the DRAM controller 116 including a memory interface. The logic to support display-refresh operations is often called a CRT controller function. The CRT controller function may be used with any type of display. Accordingly the CRT controller function is not limited to controlling a CRT but could control a LCD, OLED, LCOS, laser scanning or any other type of display. In conventional microprocessor systems, the CRT controller function is combined with the graphics engine 142. In the present invention, the CRT controller function is separate from the graphics engine 142 typically as part of the display interface 148.

The CRT controller function may also perform compositing operations in which multiple graphical images are combined to generate an image for the display. Compositing is a known technique in computer graphics and is used in Microsoft's Windows Vista operating system.

Alternately, processor 112 could include a CRT controller function but not a graphics engine, or could include both a CRT controller function and a graphics engine but the graphics engine is disabled because a discrete graphics chip is present in the south bridge 114.

Optionally, the processor or other component containing the display interface and CRT controller, but not the graphics engine, could also be equipped with all or part of a digital video decoding engine. Such a video engine can be much less complex than a high-end graphics engine, although in some implementations a graphics engine can perform video-decoding functions in software. When the video-decoding functions are divided among the graphics engine and dedicated logic blocks, for example, when the graphics engine performs transport and stream demultiplexing plus video and audio decoding and dedicated logic performs color-space conversion and video scaling, the functions implemented in dedicated logic blocks would preferably be integrated into the processor or other component containing the display interface and CRT controller function.

Separating the CRT controller function from the graphics engine and putting these two functions on separate chips allows the processor core 115 and graphics engine 142 to be designed and built separately, yet function together. In an embodiment, the CRT controller function is configured according to the requirements of the display device and the operating system.

Figure 5:
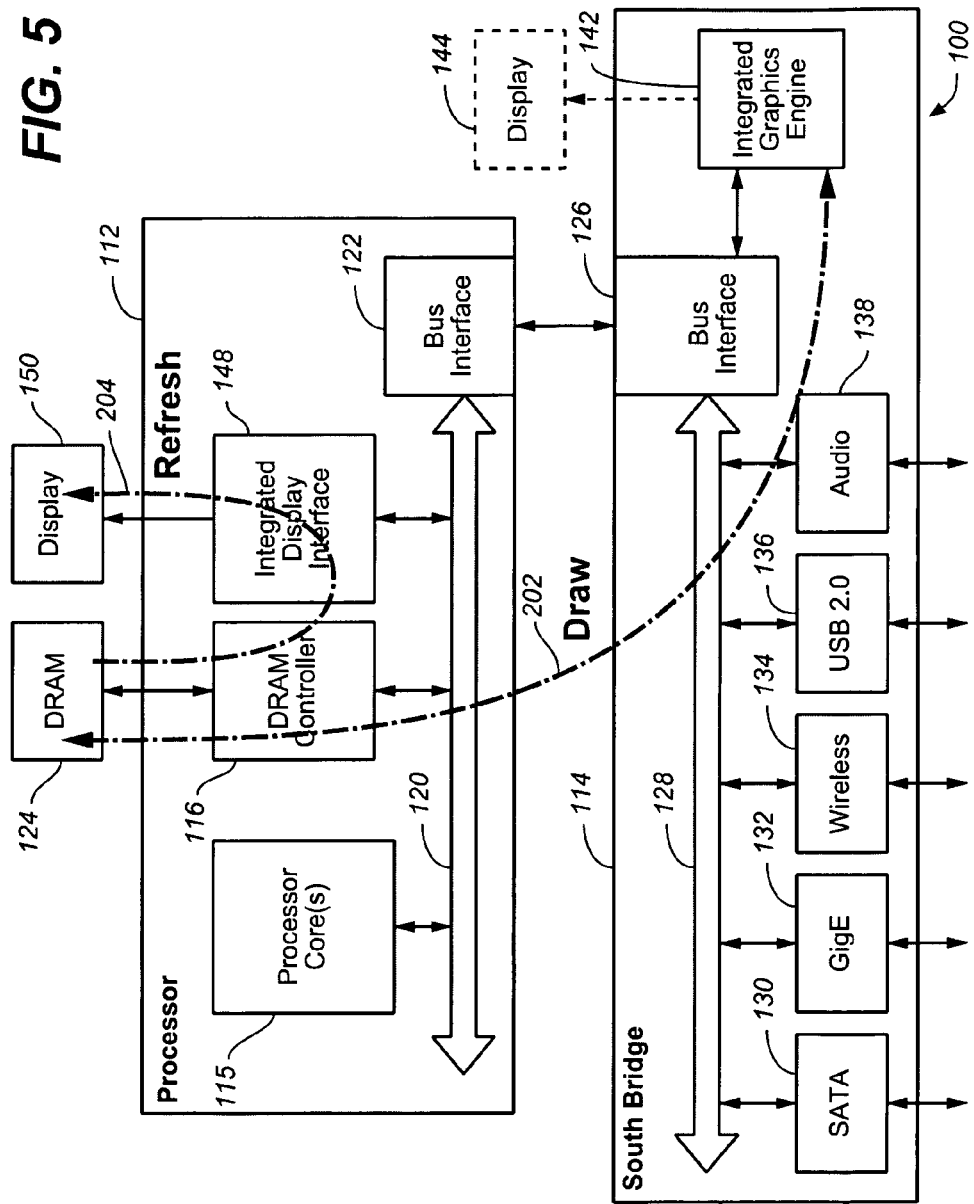
FIG. 5 illustrates the system of FIG. 4 in which the draw path and refresh path is shown.

The graphics engine 142 performs graphics operations as required by the operating system and applications, and sets pointers in the CRT controller according to the location of the frame buffer(s) located in system main memory, graphics memory, or both. Alternately these pointers may be set by software running on the processor core 115, especially for 2D-only display operations. FIG. 5 illustrates the system 100 of FIG. 4 in which the draw path 202 between DRAM 124 and the graphics engine 150 is shown.

The CRT controller then fetches display data from the DRAM 124 and transmits it to the display 150. FIG. 5 also shows the refresh path 204 between the DRAM 124 and the display device 150.

FIG. 6 has similar elements to that of FIG. 4. However, in this embodiment of the invention, the graphics engine 142 is external to the south bridge. In addition, a second memory 160 and a second display 144 are coupled to the graphics engine 142.

When software running on the processor core 114 or the graphics engine 142, or hardware in the graphics engine 142, determine that the contents of the display are not changing, such as during idle periods between keystrokes or when no applications are running, etc., the display interface 148 can be configured to refresh the display device from a compressed or otherwise static frame buffer without further graphics engine 142 intervention. To enter this mode of operation, the contents of the currently active frame buffer are copied from the dedicated graphics memory (if present) to main memory, shown in FIG. 7. During this mode of operation, the graphics engine 142 is not operating, so it can be put into a low-power configuration or powered off entirely as appropriate as illustrated in FIG. 8.

Or similarly, if the graphics processing that would otherwise be performed by the graphics engine 142 is simple enough to be performed efficiently by the processor core 115, the graphics engine 142 can be put into a low-power configuration or powered off entirely and its functions can be taken over by the processor core 115. This situation might arise if no application is currently performing any 3D rendering, since software running on a processor core 115 can perform 2D-only functions such as windows management. The basis for choosing between graphics engine 142-based operation and processor core 115-based operation could include whether the user will detect significant performance degradation due to processor core 115-based operation and whether the processor core 115 can perform the necessary functions using less total power than the graphics engine 142.

Several different system configurations become possible using this design.

Figure 1:
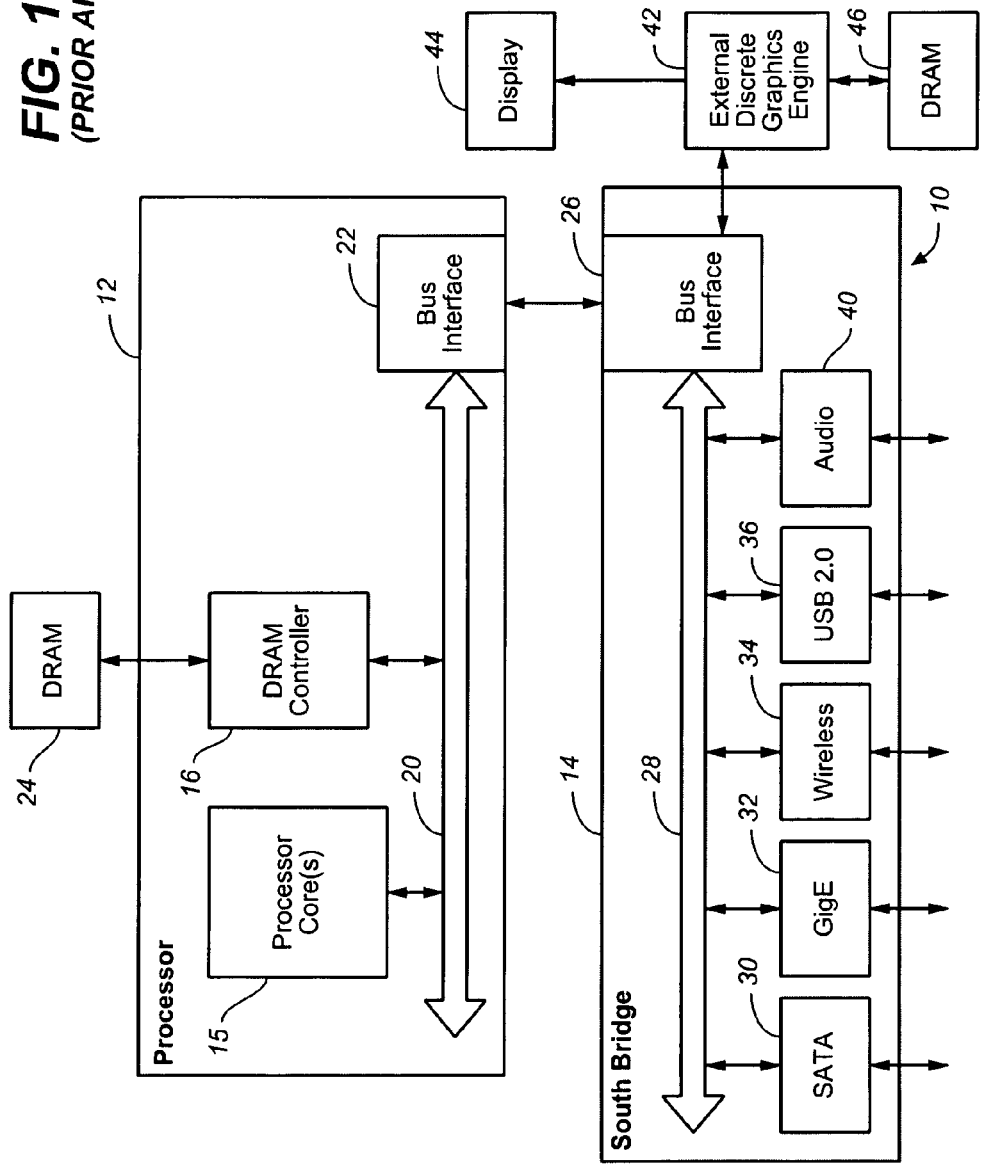
FIG. 1 is a diagram of a first conventional microprocessor system.
Figure 2:
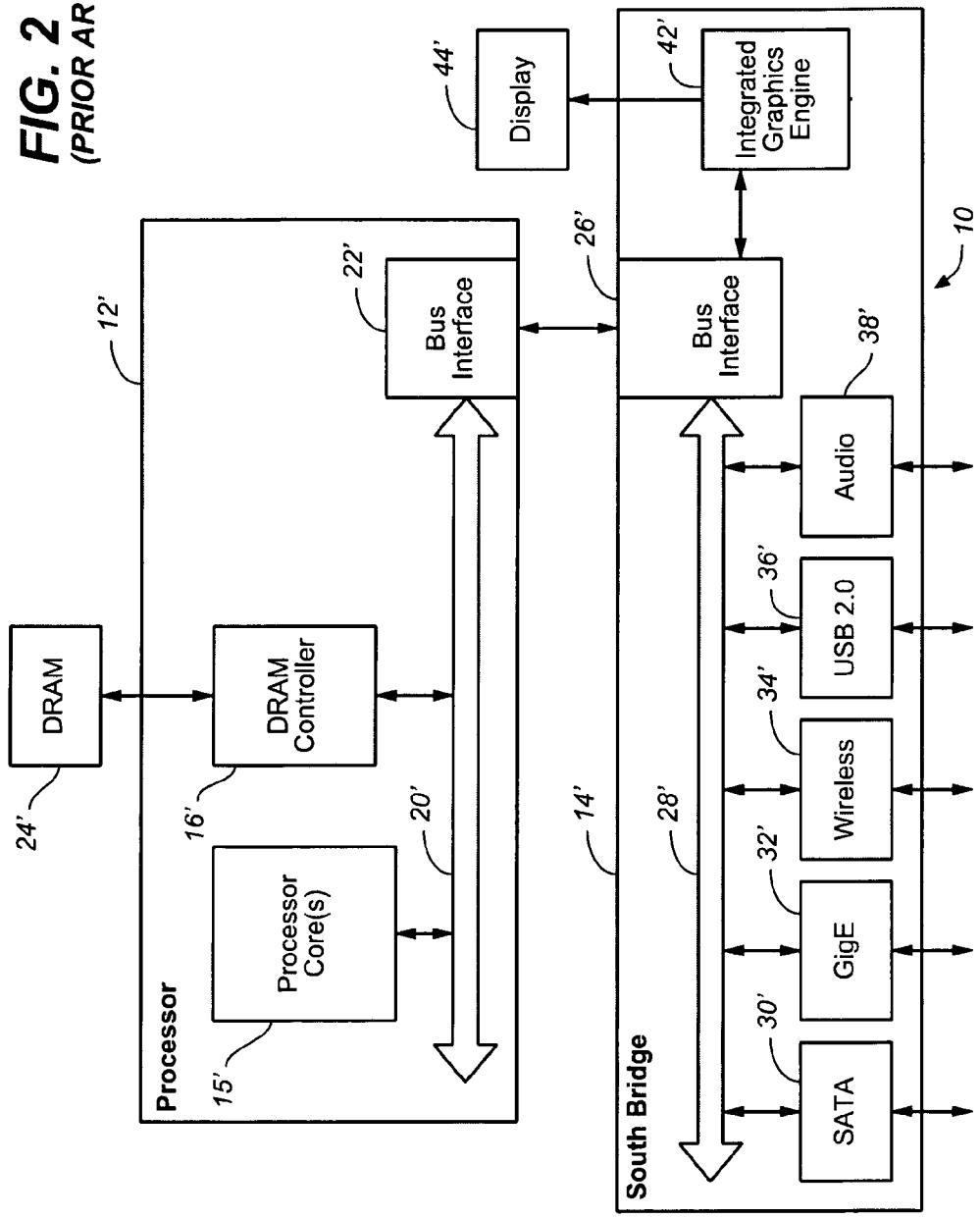
FIG. 2 is a second conventional microprocessor system.
Figure 3:
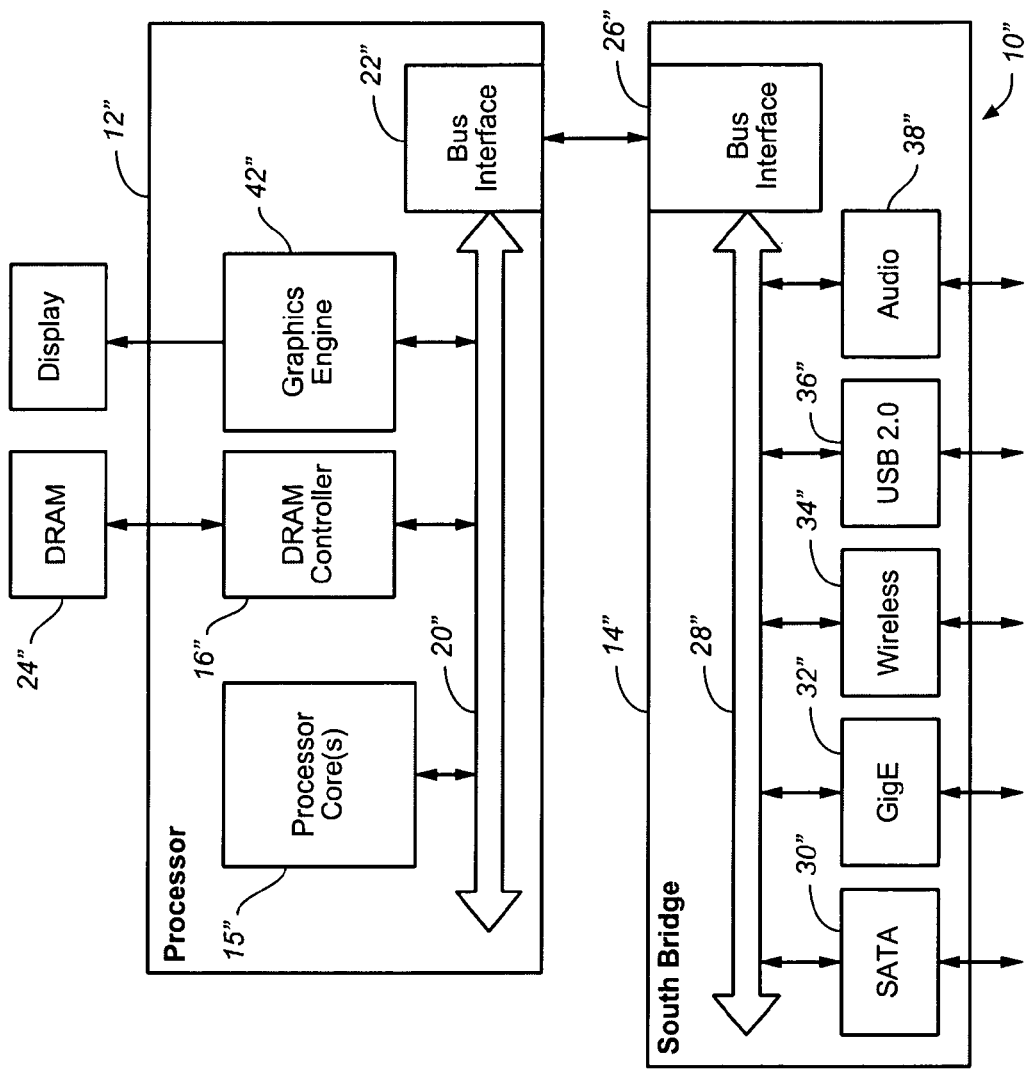
FIG. 3 is a third conventional microprocessor system.

1. Fully integrated solutions for low-end systems, with the microprocessor including fewer or smaller processor cores 15, an integrated graphics engine 42, and a display interface as shown in FIG. 3.

2. An improved UMA implementation for mid-range systems in which the microprocessor includes the processor cores 115 and display interface 148, a separate chip includes the graphics engine 142, and system memory 124 is used for both shown in FIG. 4.

3. An improved non-UMA implementation for high-end mobile systems in which the microprocessor includes the processor core 115 and display interface 148, a discrete graphics chip includes the graphics engine 142 and a local graphics-memory interface, and the display 150 is connected to the display interface 148 as shown in FIG. 6, but without the second display.

4. An improved non-UMA implementation for high-end mobile systems in which the microprocessor includes the processor core 115 and display interface 148; a discrete graphics chip includes the graphics engine 142, a local graphics-memory interface, and a local display interface; and displays 150 and 144 are connected to the display interface 148 as well as the interface on the graphics engine 142 shown in FIG. 6.

5. The traditional non-UMA implementation in which the microprocessor includes the processor core 115 and a display interface 148 that is not used; a discrete graphics chip includes the processor core 115, a local graphics-memory interface, and a local display interface; and the display is connected to the display interface on the graphics chip of FIG. 6, when the first display 150 is not used.

A system and method in accordance with the present invention thus allows the microprocessor systems to be built that have the lowest possible cost for a given level of performance because they have no unneeded display interfaces and a more economical separation of the processor core and the graphics engine. They also have the lowest possible energy consumption for display refresh options.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A processing system comprising:
 a first integrated circuit, wherein the first integrated circuit comprises a processor core, a display interface and memory controller coupled to a first bus interface; and
 a second integrated circuit in communication with the first integrated circuit,
 wherein the second integrated circuit comprises a second bus interface for allowing communication with the first integrated circuit via the first bus interface and adapted to allow for communication to a graphics engine,
 wherein the processor core controls refresh operations when the graphics engine is powered off entirely, and
 wherein whether the processor core controls refresh operations when the graphics is powered entirely off is determined based on whether a user will detect significant performance degradation.

2. The processing system of claim 1 wherein the second integrated circuit comprises:
 at least one I/O device coupled to the second bus interface.

3. The processing system of claim 1 wherein the graphics engine is coupled to at least one from a group consisting of the second bus interface, a second display, and a second memory.

4. The processing system of claim 1, wherein the processor core controlling the refresh operations when the graphics is powered entirely off is done when the graphics processing is simple enough for the processor core which includes, but is not limited to, 2D-only functions, unchanging display content, idle periods between keystrokes, and when no applications are running.

5. The processing system of claim 1 wherein the graphics engine is internal to the second integrated circuit.

6. The processing system of claim 1 wherein the graphics engine is external to the second integrated circuit.

7. The processing system of claim 3, further comprising a third integrated circuit, wherein the third integrated circuit comprises a graphics engine that communicates with the first integrated circuit.

8. The processing system of claim 1 wherein the first integrated circuit further comprises a CRT controller function.

9. The processing system of claim 8, wherein the CRT controller function is within the display interface.

10. The processing system of claim 8, wherein the CRT controller function is capable of performing compositing operations.

11. The processing system of claim 3, wherein the processor core can perform the functions of the graphics engine and the graphics engine can be disabled.

12. A method within a processing system; the processing system comprising a first integrated circuit and a second integrated circuit in communication therebetween; the method comprising:
 providing a processor core, a display interface and a memory controller in the first integrated circuit, wherein the memory controller interfaces to a first memory;
 providing a graphics engine in the second integrated circuit; wherein the graphics engine interfaces to a second memory;
 transferring graphics data from the second memory to the first memory via the display interface; and
 controlling refresh operations with the processor core when the graphics engine is powered off entirely,
 wherein whether the processor core controls refresh operations when the graphics is powered entirely off is determined based on whether a user will detect significant performance degradation.

13. The method of claim 12 wherein the graphics data is copied to the first memory by the memory controller while the data is being sent by the graphics engine to the display interface.

14. The method of claim 12 allowing the first integrated circuit to perform graphics operations when the second integrated circuit is powered off entirely.

15. The method of claim 12 wherein non-essential elements of the processing system are turned off during refresh operations.

16. A processing system comprising:
 a first integrated circuit, the first integrated circuit comprises a processor core and a CRT controller function; and
 a second integrated circuit in communication with the first integrated circuit,
 wherein the second integrated circuit includes a graphics engine,
 wherein the processor core controls refresh operations when the graphics engine is powered off entirely, and
 wherein whether the processor core controls refresh operations when the graphics is powered entirely off is determined based on whether a user will detect significant performance degradation.

17. The processing system of claim 16 wherein the CRT controller function is within a display interface in the first integrated circuit.

18. The processing system of claim 16 wherein the CRT controller function is capable of performing compositing operations.

19. The processing system of claim 16 wherein the first integrated circuit performs graphics operations when the second integrated circuit is powered off entirely.

20. The processing system of claim 16, further comprising a third integrated circuit, wherein the third integrated circuit comprises a graphics engine that communicates with the first integrated circuit.

21. The processing system of claim 16, wherein the processor core can perform the functions of the graphics engine and the graphics engine can be disabled.

22. A processing system comprising:
- a first integrated circuit, wherein the first integrated circuit comprises a processor core, a display interface and memory controller coupled to a first bus interface,
  wherein the first integrated circuit further comprises a CRT controller function, wherein the memory controller is coupled to a memory, via a first bus; and
- a second integrated circuit in communication with the first integrated circuit,
- wherein the second integrated circuit comprises a second bus coupled to the second bus interface; and at least one I/O device coupled to the second bus,
- wherein the second integrated circuit further comprises a second bus interface for allowing communication with the first integrated circuit via the first bus interface and adapted to allow for communication to a graphics engine, wherein the graphics data is copied to the memory by the memory controller while the data is being sent by the graphics engine to the display interface,
- wherein the processor core is allowed to perform graphics operations when the graphics engine is powered off entirely, and
- wherein whether the processor core controls refresh operations when the graphics is powered entirely off is determined based on whether a user will detect significant performance degradation.

23. The processing system of claim 22 wherein the CRT controller function is capable of performing compositing operations.

24. A non-transitory computer readable medium that comprises a description of a processing system and where the system comprises:
- a first integrated circuit, wherein the first integrated circuit comprises a processor core and a CRT controller function; and
- a second integrated circuit in communication with the first integrated circuit,
- wherein the second integrated circuit comprises a graphics engine,
- wherein the processor core controls refresh operations when the graphics engine is powered off entirely, and
- wherein whether the processor core controls refresh operations when the graphics is powered entirely off is determined based on whether a user will detect significant performance degradation.

* * * * *